United States Patent
Ichiki

Patent Number: 5,842,946
Date of Patent: Dec. 1, 1998

[54] PARALLEL-AXIS DIFFERENTIAL

[75] Inventor: Shiro Ichiki, Saitama-ken, Japan

[73] Assignee: Zexel Corporation, Tokyo, Japan

[21] Appl. No.: 987,556

[22] Filed: Dec. 9, 1997

Related U.S. Application Data

[63] Continuation of Ser. No. 896,420, Jul. 18, 1997, abandoned, which is a continuation of Ser. No. 542,062, Oct. 12, 1995, abandoned.

[30] Foreign Application Priority Data

Nov. 4, 1994 [JP] Japan .................................. 6-295555
Nov. 4, 1994 [JP] Japan .................................. 6-295556

[51] Int. Cl.$^6$ .................................................. F16H 3/44
[52] U.S. Cl. ........................ 475/252; 475/248; 475/331
[58] Field of Search .................................. 475/252, 248, 475/249, 331; 74/665 G, 665 GD

[56] References Cited

U.S. PATENT DOCUMENTS

| | | |
|---|---|---|
| 4,751,853 | 6/1988 | Dissett . |
| 5,055,096 | 10/1991 | Riemscheid et al. . |
| 5,122,101 | 6/1992 | Tseng ...................................... 475/252 |
| 5,147,252 | 9/1992 | Mace et al. . |
| 5,169,370 | 12/1992 | Dye et al. ............................ 475/226 X |
| 5,194,054 | 3/1993 | Amborn et al. . |
| 5,221,238 | 6/1993 | Bawks et al. . |
| 5,244,440 | 9/1993 | Ichiki et al. . |
| 5,295,923 | 3/1994 | Takefuta . |
| 5,302,159 | 4/1994 | Dye et al. ............................ 475/226 X |
| 5,366,422 | 11/1994 | Dye et al. ................................ 475/249 |
| 5,389,048 | 2/1995 | Carlson . |
| 5,415,601 | 5/1995 | Cilano . |
| 5,433,673 | 7/1995 | Cilano . |
| 5,458,546 | 10/1995 | Teraoka . |
| 5,529,547 | 6/1996 | Okuda et al. . |
| 5,632,704 | 5/1997 | Yamazaki et al. ....................... 475/248 |
| 5,658,214 | 8/1997 | Hofstetter et al. ................... 475/252 X |
| 5,713,811 | 2/1998 | Fischnaller et al. ..................... 475/252 |
| 5,730,679 | 3/1998 | Ichiki ...................................... 475/252 |

FOREIGN PATENT DOCUMENTS

| | | |
|---|---|---|
| 3920794C1 | 7/1990 | Germany . |
| 5-280596 | 10/1993 | Japan . |
| WO86/02420 | 4/1986 | WIPO . |
| WO94/19622 | 9/1994 | WIPO . |

Primary Examiner—Dirk Wright
Assistant Examiner—Peter T. Kwon

[57] ABSTRACT

In a parallel-axis differential, at least three pairs of planetary gears are rotatably receiving in a housing. At least three pairs of the planetary gears are arranged in a circumferential direction at intervals. The intervals are different from one another. Each pair of the planetary gears are in engagement with a pair of side gears respectively and also in engagement with each other. A large window opening is formed in a part of a peripheral wall of the housing which part corresponds to large one of the intervals. The large window opening is adapted to allow the passage of lubricating oil.

8 Claims, 6 Drawing Sheets

PARALLEL-AXIS DIFFERENTIAL

This is a continuation of U.S. application Ser. No. 08/896,420 filed on Jul. 18, 1997, now abandoned, which is a continuation of U.S. application Ser. No. 08/542,062, filed Oct. 12, 1995, now abandoned.

BACKGROUND OF THE INVENTION

This invention relates to a parallel-axis differential having side gears and planetary gears in parallel with the side gears.

As disclosed in U.S. Pat. No. 4,751,853, the parallel-axis differential for vehicles includes a housing rotationally driven by an engine, a pair of side gears rotatably received in and coaxial with the housing, and two pairs of planetary gears rotatably supported within the housing and being in parallel relation with the side gears. Each pair of planetary gears are in engagement with the pair of side gears, respectively, and also in engagement with each other. The pair of side gears are connected to end portions of a pair of coaxial output shafts, respectively.

The housing is received in a differential case. Lubricating oil is stored on a bottom portion of the differential case. A plurality of window openings are formed in a peripheral wall of the housing. In accordance with rotation of the housing, the lubricating oil enters the housing through the window openings in order to lubricate the gears in the housing. Two window openings are formed in the peripheral wall of the housing which peripheral wall corresponds to intervals between two paired planetary gears. Since the number of pairs of the planetary gears is small, the window openings can be formed comparatively large, thus enabling the passage of a sufficient amount of lubricating oil.

In WO 94/19622, there is disclosed the same type of a differential as mentioned above but having three or more pairs of planetary gears. In this differential, since an interval between a pair of planetary gears and another pair of planetary gears adjacent thereto is reduced, an opening area of each window opening is also reduced.

Other prior art related to the present invention will be briefly described hereinafter. In Japanese Laid-Open Patent Application No. Hei 5-280596, four pairs of planetary gears are disclosed. These planetary gears are equally spacedly arranged in a circumferential direction. Window openings are formed in opposite end walls of a housing. A small window opening is formed in a peripheral wall of the housing.

In U.S. Pat. No. 5,194054, there is disclosed a differential having three pairs of planetary gears which are arranged in asymmetrical relation in a circumferential direction. Window openings are formed in end walls of a housing but no window opening is formed in a peripheral wall of the housing.

In all of the above-mentioned prior art techniques, the planetary gears are received in pockets formed on the housing and rotatable relative to the housing with an outer peripheral surface of each planetary gear being in contact with an inner peripheral surface of each pocket. The friction generated between the outer peripheral surface of each planetary gear and the inner peripheral surface of each pocket increases a bias ratio of torque.

U.S. Pat. No. 5,122,101 discloses a differential having three pairs of planetary gears. Each window opening is not formed between a pair of planetary gears and another pairs of planetary gears adjacent thereto but formed in a peripheral wall of a housing which peripheral wall is faced with

2 each planetary gear. The planetary gears are all rotatably supported by the housing through shaft portions each having a reduced diameter which shaft portions project from opposite ends of the planetary gears.

SUMMARY OF THE INVENTION

It is, therefore, an object of the present invention to provide a parallel-axis differential, in which an opening area of each window opening for allowing the passage of lubricating oil can be increased.

According to the present invention, there is provided a parallel-axis differential, comprising:

(a) a housing rotatable about a rotational axis upon receipt of a rotational torque, the housing having a window opening, the window opening being formed in a peripheral wall of the housing and adapted to allow the passage of lubricating oil;

(b) a pair of side gears rotatably received in the housing and coaxial with the housing, the pair of side gears being connected to end portions of a pair of coaxial output shafts, respectively; and (c) at least three pairs of planetary gears rotatably received in the housing and being parallel with the rotational axis of the housing, the at least three pairs of planetary gears being arranged in a circumferential direction of the housing at intervals, each pair of the planetary gears being in engagement with the one pair of side gears respectively and also in engagement with each other;

(d) the intervals being different from one another, the window opening being formed in a part of the peripheral wall of the housing which part corresponds to large one of the intervals.

DETAILED DESCRIPTION OF THE EMBODIMENT

Figure 1:
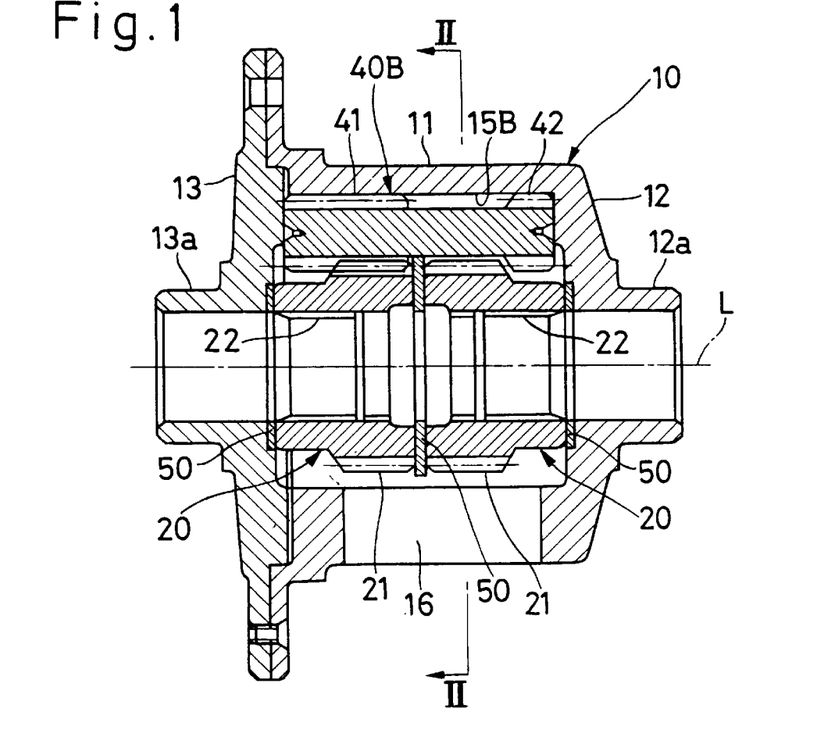
FIG. 1 is a vertical sectional view of a differential according to one embodiment of the present invention and is a sectional view taken on line I—I of FIG. 2.

One embodiment of the present invention will now be described with reference to FIGS. 1 to 3. As shown in FIGS.

1 to 3, a parallel-axis differential for vehicles includes a housing 10 which is received in a differential case, not shown. This housing 10 includes a sleeve portion 11, an end wall 12 integral with one end of the sleeve portion 11, and a closure 13 (the other end wall) for closing an opening in the other end of the sleeve portion 11. The end wall 12 and closure 13 of the housing 10 are formed with journal portions 12a and 13a, respectively. The housing 10 is rotatably supported about an axis L through the journal portions 12a and 13a carried on bearings of the differential case. A ring gear (not shown) is secured to the closure 13 of the housing 10. The housing 10 receives a driving torque from an engine through the ring gear and a gear which is in engagement with the ring gear.

A pair of cylindrical side gears 20 are rotatably received in and coaxial with the housing 10. The side gears 20 have helical teeth 21 on their outer peripheries, respectively. The helical teeth 21 of the pair of side gears 20 are equal to each other in helical angle. The helical direction of the helical teeth 21 of the pair of side gears 20 may be arranged in a reverse direction or in the same direction.

A pair of left and right axles 30 (output shafts) of a vehicle extend through the journal portions 12a and 13a, with end portions thereof being in spline-connection with spline portions 22 of the pair of side gears 20, respectively.

Figure 2:
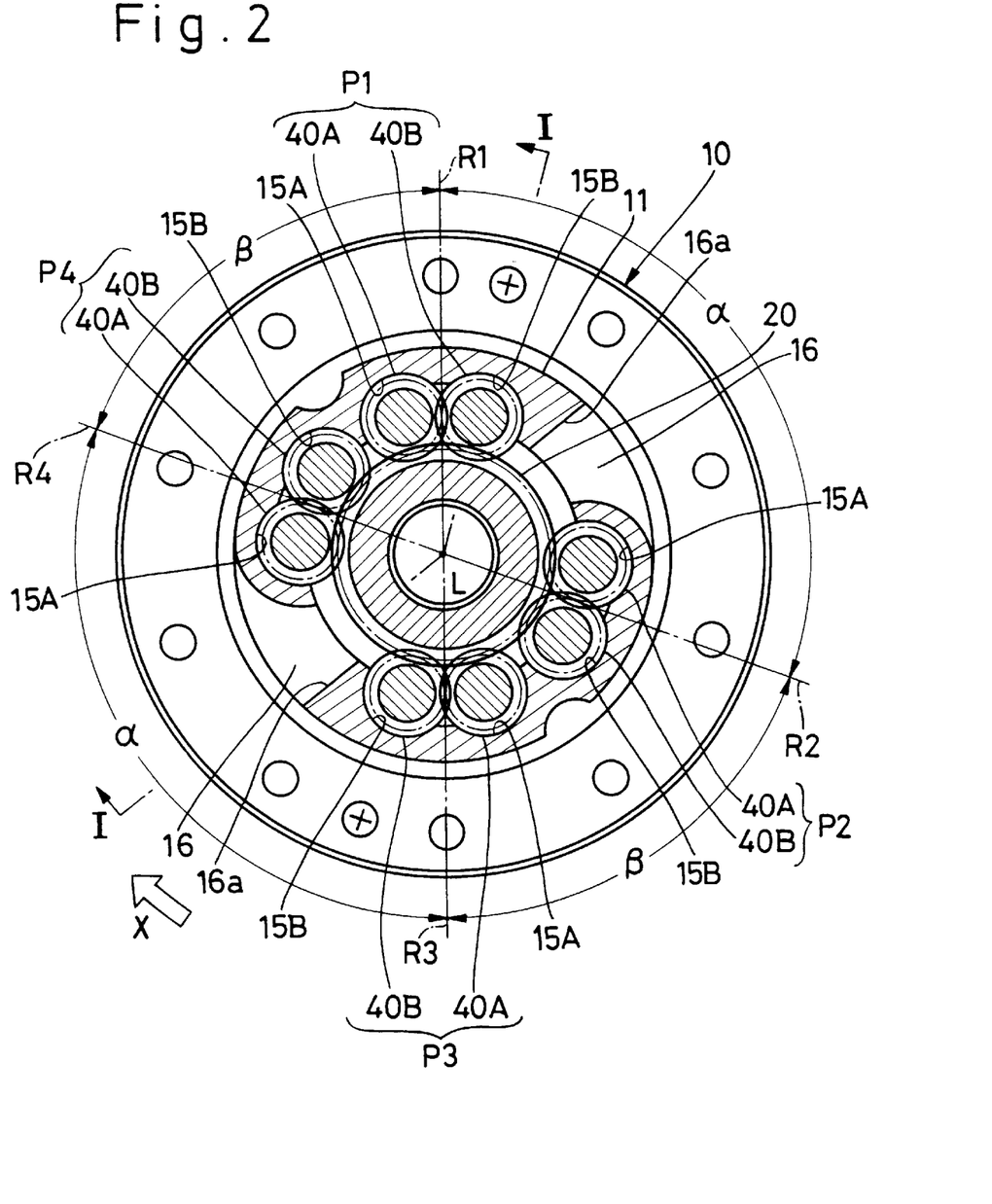
FIG. 2 is a sectional view taken on line II—II of FIG. 1.

As shown in FIG. 2, four of paired pockets 15A, 15B are formed on an inner peripheral surface of the sleeve portion 11 of the housing 10 along the circumferential direction. Each paired pockets 15A, 15B extend in parallel relation to the axis L of the housing 1. The pockets 15A, 15B constituting each pair are adjacent to each other. An inner peripheral surface of each pocket 15A, 15B is cylindrical. Paired planetary gears 40A, 40B are rotatably received in the paired pockets 15A, 15B, respectively. The planetary gears 40A, 40B are in parallel relation to the axis L of the housing 10. Each of the planetary gears 40A, 40B includes a first helical teeth 41 long in an axial direction and a second helical teeth 42 short in the axial direction.

Figure 3:
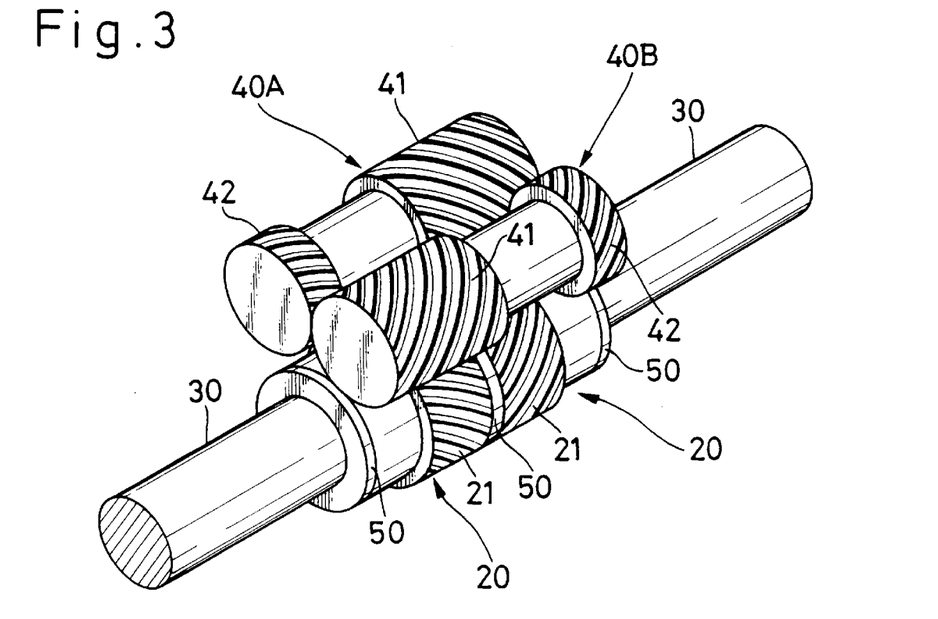
FIG. 3 is a perspective view of a general construction of gears in the differential. In this Figure, a housing is omitted and only one pair, among others, of planetary gears are shown.

As best shown in FIG. 3, the first helical teeth 41 of the planetary gear 40A is in engagement with one of the side gears 20 and also in engagement with the second helical teeth 42 of the other planetary gear 40B. Similarly, the first helical teeth 41 of the planetary gear 40B is in engagement with the other side gear 20 and also in engagement with the second helical teeth 42 of the planetary gear 40A.

Thrust washers 50 are arranged between the end wall 12 of the housing 10 and one of the side gears 20, between the pair of side gears 20, and between the other side gear 20 and the closure 13 of the housing 10, respectively.

The above-mentioned construction is basically the same to that of the conventional parallel-axis differential for vehicles. Next, important features of the present invention will be described. The four paired planetary gears 40A, 40B are arranged in the circumferential direction in the following manner. Here, the four pairs of the planetary gears 40A, 40B are represented clockwise in FIG. 2 by P1, P2, P3 and P4, respectively. Radial lines passing through engaging parts of the planetary gears 40A, 40B in the four pairs P1, P2, P3 and P4 and intersecting at right angles the rotational axis L are represented by R1, R2, R3 and R4, respectively. An angle of intersection between the radial lines R1 and R2 is equal to an angle of intersection between the radial lines R3 and R4 and represented by $\alpha$. Likewise, an angle of intersection between the radial lines R2 and R3 is equal to an angle of intersection between the radial lines R4 and R1 and represented by $\beta$. The radial lines R1 and R3 are connected together to form a linear line, and the remaining radial lines R2 and R4 are also connected together to form a linear line. The intersection angle $\alpha$ is larger than the intersection angle $\beta$.

In order to enable engagement between the pair of side gears 20 and the four pairs of the planetary gears 40A, 40B, the following equation must be satisfied.

$$\delta = (n \times 360°)/(2 \times Ns)$$

where $\delta = \alpha - 90° = 90° - \beta$, n is an integer, and Ns is the number of teeth of each side gear 20.

Since the intersection angle $\alpha$ is large, the first pair P1 and the second pair P2 are spaced away from each other at a large interval, and the third pair P3 and the fourth pair P4 are also spaced away from each other at a large interval. The two large intervals are equal to each other. Large window openings 16 are formed in parts of a peripheral wall of the housing 10 which parts correspond to the two large intervals, respectively.

On the other hand, since the intersection angle $\beta$ is small, the second pair P2 and the third pair P3 are spaced away from each other at a very small interval, and the fourth pair P4 and the first pair P1 are also spaced away from each other at a very small interval. The two very small intervals are equal to each other. No window is formed in parts of the peripheral wall of the housing 10 which parts correspond to the two very small intervals.

The window openings 16 are employed in order to supply lubricating oil stored on a bottom portion of the differential case into the housing 10 when the housing 10 rotates. Since the window openings 16 are large in opening areas, the lubricating oil can easily be introduced into the housing 10 therethrough.

A circumferential width of each window opening 16 formed in the peripheral wall of the housing 10 is gradually increased radially and outwardly. Owing to this arrangement, smooth introduction of the lubricating oil in accordance with rotation of the housing 10 is ensured. A surface 16a at one circumferential end of each window opening 16, i.e., a surface facing in a rotating direction X of the housing 10 when the vehicle travels forwardly, is gradually inclined forwardly in the rotating direction X of the housing 10 (see FIG. 2). This arrangement ensures an easy introduction of the lubricating oil into the housing 10 in accordance with rotation of the housing 10.

A total opening area of the two window openings 16 can be larger than a total opening area of window openings of the conventional differential where the four pairs P1 to P4 are arranged at equal intervals and the window openings are formed in areas between all adjacent pairs, respectively. The reason is as follows. Only two window openings 16 are formed in parts of the peripheral wall of the housing 10 which parts correspond to the large interval $\alpha$. This makes it possible to reduce the number of wall portions adapted to partition the window openings 16 and the pockets 15A, 15B. As a consequence, the total opening area of the window openings can be increased to that extent.

The planetary gears 40A, 40B are merely received in the pockets 15A, 15B respectively and capable of moving slightly radially. The arrangement being such that when the planetary gears 40A, 40B, which are differentially rotating, receives radial force caused by engagement between the planetary gears 40A, 40B, and the side gears 20, the planetary gears 40A, 40B rotate with outer peripheral surfaces (top surfaces of the helical teeth 41, 42) thereof being in contact with inner peripheral surfaces of the pockets 15A, 15B. A bias ratio of torque can be increased by friction caused by the rotation of the planetary gears 40A, 40B.

The planetary gears 40A, 40B are arranged in symmetrical relation with respect to the rotational axis L, and the radial forces applied to the housing 10 from all of the planetary gears 40A, 40B are offset. In other words, radial reaction forces coming from the housing 10 and acting on the side gears 20 through all of the planetary gears 40A, 408 are offset. This ensures a well-balanced rotation of the differential.

Figure 4:
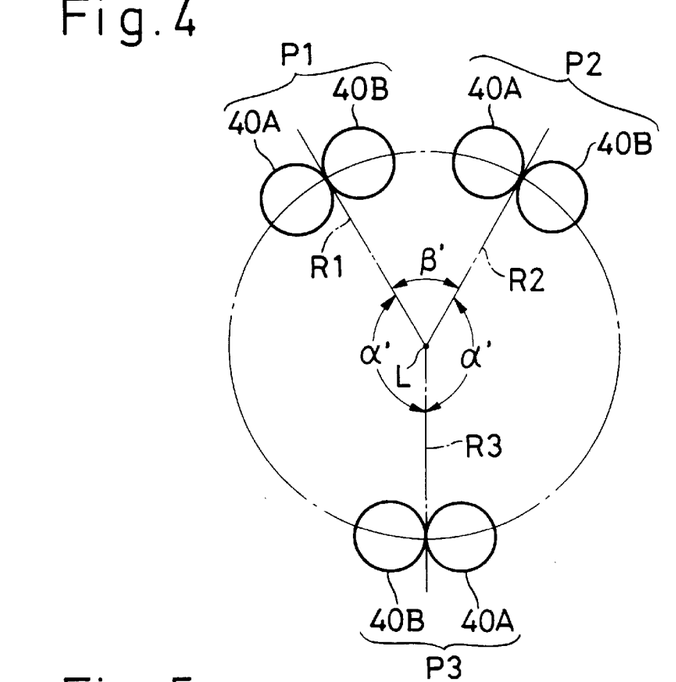
FIG. 4 is a schematic view showing a circumferential arrangement in which three pairs of planetary gears are employed.

In the above-mentioned embodiment, the number of pairs of the planetary gears may be three or five or more. As shown in FIG. 4, in case of three pairs, for example, the first and the second pair P1 and P2 are circumferentially arranged at a small interval β', and the third pair P3 is arranged to be circumferentially away from the first and the second pair P1 and P2 at equal large intervals α'. The window openings are formed only in the areas between the first pair P1 and the third pair P3 and between the second pair P2 and the third pair P3.

Figure 5:
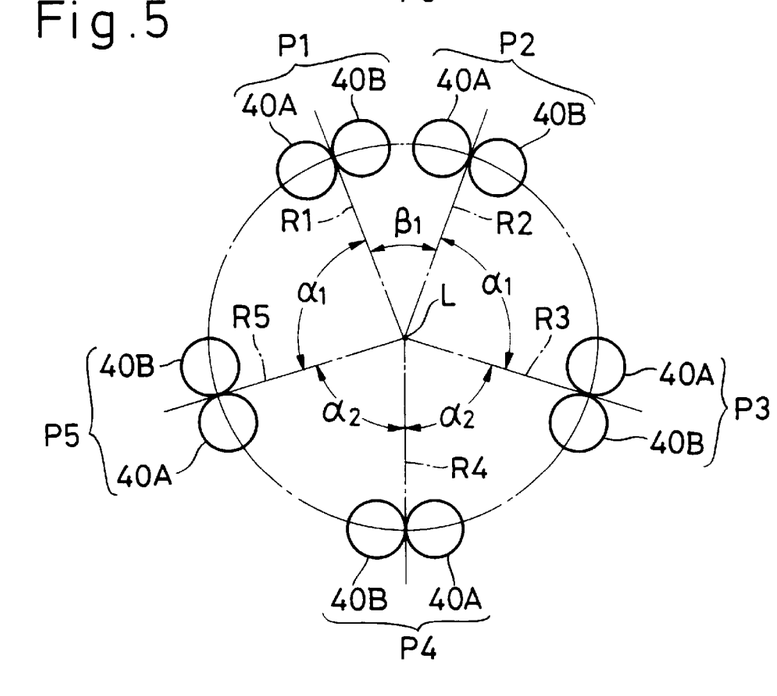
FIG. 5 is a schematic view showing a circumferential arrangement in which five pairs of planetary gears are employed.

As shown in FIG. 5, in case of five pairs of planetary gears 40A, 40B, an interval between the first pair P1 and the second pair P2 is represented by $β_1$. An interval between the second pair P2 and the third pair P3 and an interval between the fifth pair P5 and the first pair P1 are equal to each other and represented by $α_1$. An interval between the third pair P3 and the fourth pair P4 and an interval between the fourth pair P4 and the fifth pair P5 are equal to each other and represented by $α_2$. Here, $β_2 < α_2 < α_1$. Four window openings, in total, are formed in areas of the peripheral wall of the housing which areas correspond to the intervals $α_1$ and $α_2$, respectively.

In FIG. 5, the interval $α_2$ may be equal to the interval $α_1$.

Also, in FIG. 5, it may be designed such that the interval $α_2$ is generally equal to the interval $β_1$ and no window opening is formed in areas of the peripheral wall of the housing which areas correspond to this interval $α_2$. In that case, the interval al is increased and two window openings, in total, are formed in areas of the peripheral wall of the housing which areas correspond to the interval $α_1$.

Next, a second embodiment of the present invention will be described with reference to FIGS. 6 to 9. Since this second embodiment basically has the same construction as the first embodiment, like parts are denoted by like reference numerals and detailed description is omitted. The second embodiment is different from the first embodiment in the respects that, as in the ordinary differential, four pairs of planetary gears 40A, 40B are circumferentially arranged at equal intervals and four window openings 16, in total, are formed in areas between circumferentially adjacent pairs.

Figure 6:
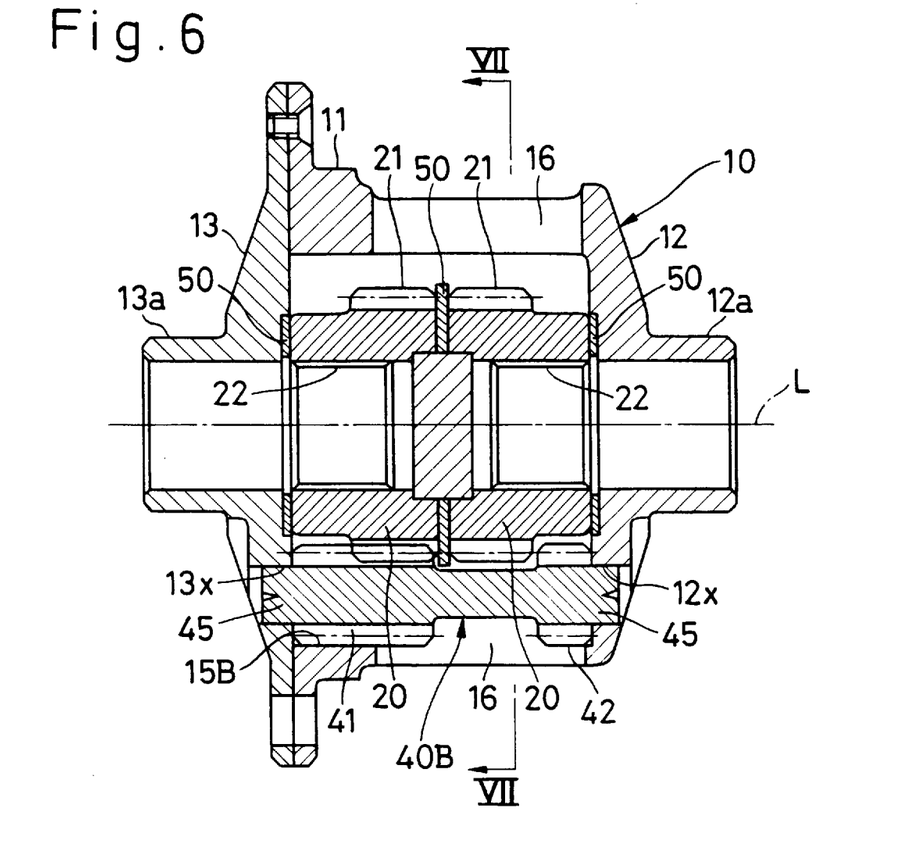
FIG. 6 is a vertical sectional view of a differential according to another embodiment of the present invention and is a sectional view taken on line VI—VI of FIG. 7.

In the second embodiment, the following elaborations are made in order to increase the opening area of each window opening 16. The planetary gears 40A, which are backwardly located in the sense of a rotating direction X of the housing 10 when the vehicle travels forwardly, are merely received in pockets 15A (see FIG. 8) and rotatably supported by the housing 10 with an outer peripheral surface of each planetary gear 40A being in contact with an inner peripheral surface of each pocket 15A as in the case with the first embodiment. The planetary gears 40A have no shaft portion. However, the other planetary gears 40B, which are located forwardly in the sense of the rotating direction X of the housing 10 when the vehicle travels forwardly, are each provided at opposite end faces thereof with shaft portions 45 which have smaller diameters than helical teeth 41, 42, as shown in FIG. 6. The shaft portions 45 are rotatably fitted to support holes 12x, 13x formed in an end wall 12 and a closure 13 in such a manner as to correspond to the pockets 15B. As a consequence, the planetary gears 40B are rotatably supported by the housing 10.

Figure 7:
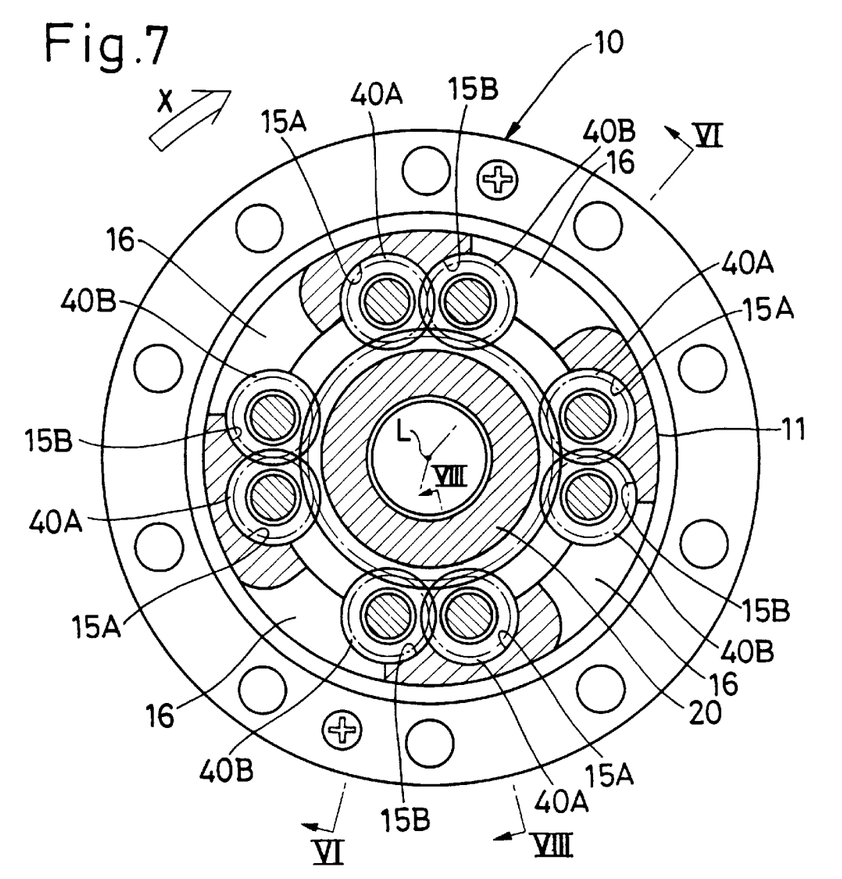
FIG. 7 is a sectional view taken on line VII—VII of FIG. 6.
Figure 8:
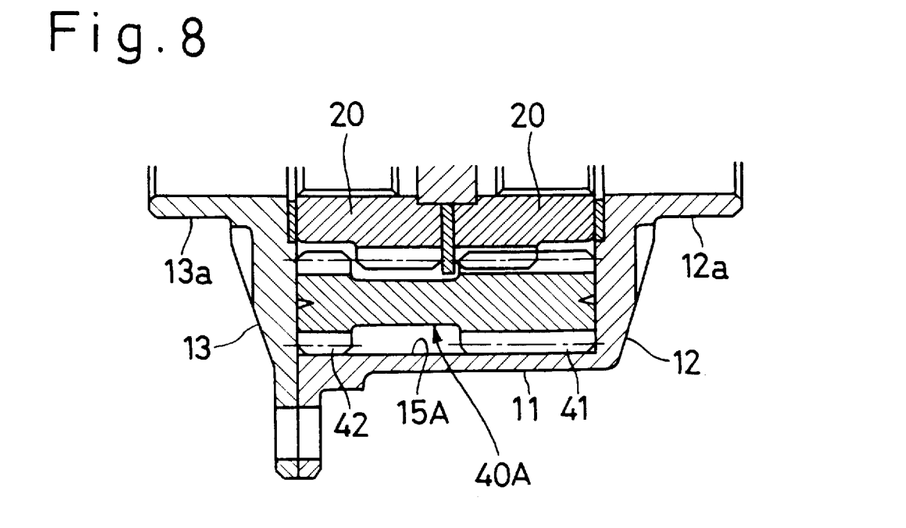
FIG. 8 is a sectional view taken on line VIII—VIII of FIG. 7.

One circumferential end portion of each window opening 16 extends to a position facing with its corresponding planetary gear 40B and exposes parts of the helical teeth 41, 42 of the planetary gear 40B. As a consequence, the opening area of each window opening 16 is increased. As mentioned above, since each planetary gear 40B is supported by the housing 10 through the pair of shaft portions 45 and each pocket 15B does not have the role for supporting the planetary gear 40B, each window opening 16 can be increased in opening area.

As mentioned above, in the event that the planetary gear 40B is supported by the shaft portions 45, frictional torque between outer peripheral surfaces of the shaft portions 45 having a reduced diameter and inner peripheral surfaces of support holes 12X, 13x is reduced. However, when the vehicle travels forwardly, the reduction of the frictional torque at the planetary gear 40B does not reduce the bias ratio of torque extensively. The reasons are as follows.

Figure 9:
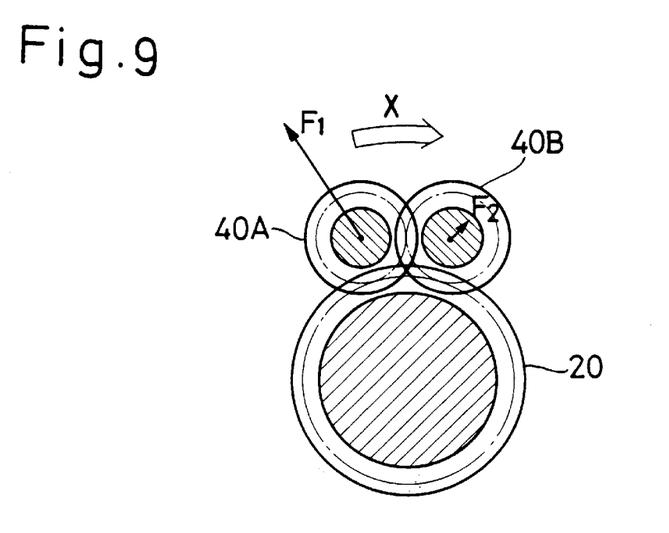
FIG. 9 is a view showing a radial force acting on planetary gears when the housing is rotated in a forwarding direction of a vehicle.

When the housing 10 is rotated in an X-direction during forward traveling of the vehicle, as shown in FIG. 9, the radial force acting between the planetary gear 40B, which is located forwardly in the sense of the rotating direction X, and the housing 10 and its reaction force $F_2$ are, by far, smaller than radial force acting between the planetary gear 40A, which is located backwardly in the sense of the rotational direction X, and the housing 10 and its reaction force $F_1$. Accordingly, torque distribution chiefly depends on friction between the outer peripheral surface (top surface of the helical teeth 41 and 42) of the planetary gear 40A and the inner peripheral surface of the pocket 15A during forward traveling of the vehicle. Since this frictional torque is large as the ordinal differential, reduction of the bias ratio of torque is not resulted.

Figure 10:
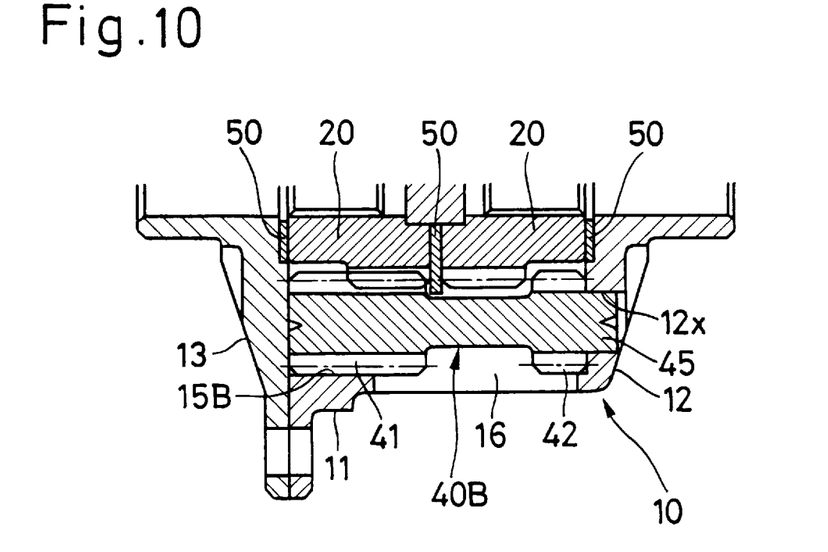
FIG. 10 is a view like FIG. 8 but according to a modified embodiment.
Figure 11:
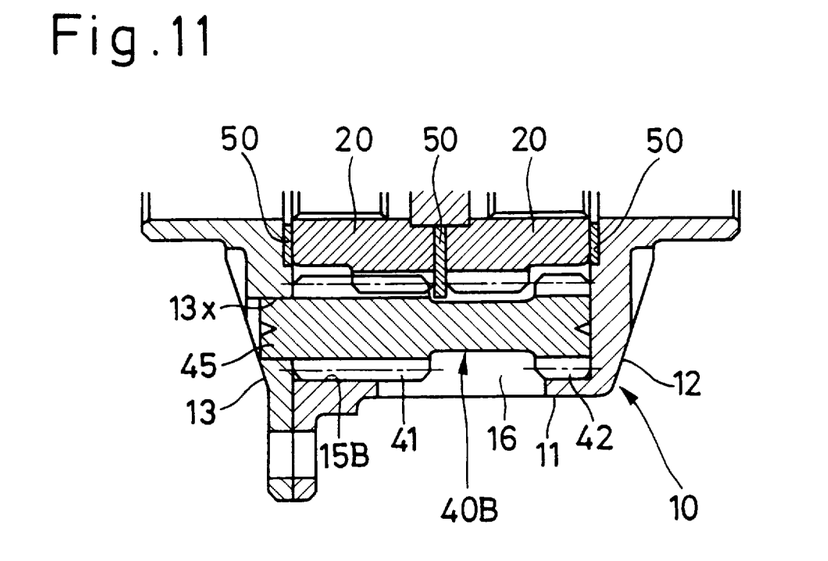
FIG. 11 is a view like FIG. 8 but according to a further modified embodiment.

In the above-mentioned second embodiment, the planetary gear 40B may be rotatably supported by the housing 10 through a single shaft portion 45 as shown in FIGS. 10 and 11. In that case, an end portion of the planetary gear 40B opposite the shaft portion 45 is supported by the housing 10 with an outer peripheral surface thereof being in contact with an inner peripheral surface of an end portion of the pocket 15B.

In the second embodiment, the number of pairs of the planetary gears may be three or five or more.

What is claimed is:

1. A parallel-axis differential for vehicle, comprising:
   (a) a housing rotationally driven about a rotational axis upon receipt of a rotational torque;
   (b) a pair of side gears rotatably received in said housing and coaxial with said rotational axis, said pair of side gears being connected to end portions of a pair of coaxial output shafts, respectively, said side gears each having a helical teeth portion formed on an outer periphery thereof;
   (c) at least three planetary mechanisms arranged at intervals in a circumferential direction of said housing, said planetary mechanisms each having first and second planetary gears rotatably received in said housing, said first and second planetary gears being parallel to the rotational axis of said housing, said first and second planetary gears each having a helical teeth arrangement formed on an outer periphery thereof, said helical teeth arrangement of said first and second planetary gears meshing with said helical teeth portions of said side gears, respectively, and also meshing with each other, said first planetary gear located forward of said second planetary gear relative to a rotational direction of said housing when the vehicle is traveling forward; and (d) window openings formed in a peripheral wall of said housing and adapted to allow the passage of lubricant, said window openings being disposed in correspondence with the intervals between said planetary mechanisms, said window openings each having an extension that exposes an outer peripheral surface of said helical teeth arrangement of said first planetary gear, said window openings being separated from said second planetary gears in the circumferential direction.

2. The differential according to claim 1, in which said first planetary gear has two shaft portions projecting respectively from opposite end faces thereof, said first planetary gear being rotatably supported by said housing through said shaft portions.

3. The differential according to claim 1, in which said first planetary gear has a shaft portion formed on only one end face of said first planetary gear, and an end portion of said first planetary gear opposite said shaft portion is received in a pocket formed on said housing, said first planetary gear being rotatably supported by said housing with an outer peripheral surface of said end portion of said first planetary gear being in contact with an inner peripheral surface of said pocket.

4. A differential according to claim 1, wherein said first and second planetary gears are supported by said housing in different manners from each other, said first planetary gear having a shaft portion projecting axially at least from one end face thereof and supported by and rotatable relative to said housing with said shaft portion fitted to a support hole formed in said housing, said shaft portion being smaller in an outer diameter than said helical teeth arrangement of said first planetary gear, and said second planetary gear being received in a pocket formed on an inner periphery of said housing, an outer peripheral surface of said helical teeth arrangement of said secondary planetary gear being in contact with an inner periphery of said pocket, wherein said second planetary gear is supported by and rotatable relative to said housing without the aid of a shaft portion.

5. A differential according to claim 4, wherein said helical teeth arrangement of each of said first and second planetary gears includes first and second helical teeth sections axially spaced from each other; said first helical teeth section being longer in the axial direction than said second helical teeth section; said first helical teeth section of said first planetary gear meshing with said helical teeth portion of one of said side gears and with said second helical teeth section of said second planetary gear, and said first helical teeth section of said second planetary gear meshing with said helical teeth portion of another of said side gears and with said second helical teeth section of said first planetary gear.

6. A differential according to claim 5, wherein said extension of said window opening exposes both of said first and second helical teeth sections of said first planetary gear; and said first planetary gear has two shaft portions projecting respectively from opposite end faces thereof, said first planetary gear being rotatably supported by said housing through said shaft portions.

7. A differential according to claim 5, wherein said extension of said window opening exposes only one of said first and second helical teeth section of said first planetary gear; said shaft portion is formed on only one end face of said first planetary gear adjacent to said exposed helical teeth section; and the other of said first and second helical teeth section of said first planetary gear is received in another pocket formed on said housing, an outer peripheral surface of the other helical teeth section being in contact with an inner peripheral surface of said another pocket.

8. A differential according to claim 5, wherein said extension of said window opening exposes said second helical teeth section of said first planetary gear and part of said first helical teeth section closed to said second helical teeth section; said shaft portion being formed only on one end face of said first planetary gear adjacent to said second teeth section; and said first helical teeth section of said first planetary gear being received in another pocket formed on said housing, an outer peripheral surface of said first helical teeth section being in contact with an inner peripheral surface of said another pocket.

\* \* \* \* \*